US008995252B2

(12) United States Patent
Datta et al.

(10) Patent No.: US 8,995,252 B2
(45) Date of Patent: Mar. 31, 2015

(54) VOIP MULTILINE FAILOVER (75) Inventors: Sanchaita Datta, Salt Lake City, UT (US); Bhaskar Ragula, Salt Lake City, UT (US); Padmanaban Balasubramaniam, Salt Lake City, UT (US)

(73) Assignee: FatPipe Networks, Salt Lake City, UT (US)

( * ) Notice: Subject to any disclaimer, the term of this patent is extended or adjusted under 35 U.S.C. 154(b) by 329 days.

(21) Appl. No.: 11/680,593

(22) Filed: Feb. 28, 2007

(65) Prior Publication Data
US 2008/0317011 A1  Dec. 25, 2008

Related U.S. Application Data (60) Provisional application No. 60/863,378, filed on Oct. 29, 2006, provisional application No. 60/866,934, filed on Nov. 22, 2006, provisional application No. 60/891,920, filed on Feb. 27, 2007.

(51) Int. Cl.
*H04L 29/06* (2006.01)
*H04L 12/46* (2006.01)
*H04L 12/26* (2006.01)

(52) U.S. Cl.
CPC ......... *H04L 65/1069* (2013.01); *H04L 12/2602* (2013.01); *H04L 12/4633* (2013.01); *H04L 43/00* (2013.01); *H04L 43/0829* (2013.01); *H04L 43/0852* (2013.01); *H04L 43/087* (2013.01); *H04L 65/1006* (2013.01); *H04L 65/80* (2013.01)
USPC ........................................ 370/225

(58) Field of Classification Search
CPC ............ H04L 65/1069; H04L 12/2602; H04L 12/4633; H04L 43/00; H04L 43/0829; H04L 43/0852; H04L 43/087; H04L 65/1006; H04L 65/80
USPC .......................................... 370/356, 223, 224
See application file for complete search history.

(56) References Cited

U.S. PATENT DOCUMENTS

| | | | |
|---|---|---|---|
| 6,614,781 B1 | 9/2003 | Elliott et al. | |
| 6,687,245 B2 * | 2/2004 | Fangman et al. | 370/356 |
| 6,778,492 B2 * | 8/2004 | Charny et al. | 370/228 |
| 7,002,935 B2 * | 2/2006 | Kriaras et al. | 370/328 |
| 7,010,716 B2 * | 3/2006 | Yu et al. | 714/4 |
| 7,149,769 B2 * | 12/2006 | Lubbers et al. | 709/201 |
| 7,436,820 B2 * | 10/2008 | Beck et al. | 370/352 |

(Continued)

OTHER PUBLICATIONS

Pages from "define: voip" Google Search, www.google.com, Jan. 30, 2007.

(Continued)

*Primary Examiner* — Mohammad Anwar
(74) *Attorney, Agent, or Firm* — Ogilvie Law Firm (57) ABSTRACT Tools and techniques are provided to provide Voice-over-IP (VoIP) communications. On receiving a user request to initiate a telephonic connection from a local site, at which the user is using a VoIP telecommunication device which has no link failover functionality, a system establishes over wide area network links at least two tunnels between a controller at the local site and another controller. Then the system transmits VoIP traffic over at least one of the tunnels from the controller at the local site to the other controller. The system also detects failure of the primary tunnel during the call and performs failover by changing a data path during the call to transmit packets over at least one non-failed tunnel.

20 Claims, 3 Drawing Sheets (56) References Cited

U.S. PATENT DOCUMENTS

| | | | | |
|---|---|---|---|---|
| 7,565,689 | B2* | 7/2009 | Brown et al. | 726/15 |
| 7,738,368 | B2* | 6/2010 | Walter et al. | 370/230 |
| 7,801,030 | B1* | 9/2010 | Aggarwal et al. | 370/228 |
| 2002/0176404 | A1 | 11/2002 | Girard | |
| 2002/0188732 | A1* | 12/2002 | Buckman et al. | 709/228 |
| 2004/0260747 | A1* | 12/2004 | Ying et al. | 709/200 |
| 2005/0076207 | A1* | 4/2005 | Park et al. | 713/163 |
| 2005/0163166 | A1 | 7/2005 | Ying et al. | |
| 2006/0193311 | A1 | 8/2006 | Kim et al. | |
| 2006/0262789 | A1* | 11/2006 | Peleg et al. | 370/389 |
| 2008/0144641 | A1* | 6/2008 | Le Roux et al. | 370/401 |

OTHER PUBLICATIONS

Tracy L. Thorpe, "Voice, IP, and ATM MPLS Features", www.ciscopress.com/articles, May 17, 2002.
Andrew R. Hickey, "Asterisk VoIP gets redundant", searchvoip.techtarget.com, May 9, 2006.
"WellSIP 6500 V2 (Telephony SIP Proxy Server)", www.moonblinkwifi.com, no later than Nov. 2, 2006.
"EdgeVoIP-75", www.xroadsnetworks.com, no later than Nov. 2, 2006.
"FatPipe Products", selected Product Overviews, www.fatpipeinc.com, no later than Mar. 2, 2007.
"Asterisk(r)—the Open Source PBX!", www.asterisk.com, Jul. 26, 2005.
Kerry Garrison, "Sipura SPA-3000 Review", voipspeak.net, Jun. 9, 2006.
"FatPipe Networks' WAN Optimization and Security Product, MPVPN, Provides Uninterrupted WAN Uptime of VoIP, Video, Citrix Thin Client, and VPN Traffic Using Patented MPSec Technology", www.fatpipeinc.com/press/releases, Sep. 21, 2005.
"XRoads Launches EdgeVoIP Traffic Manager", www.voiploop.com, Aug. 21, 2006.
"Session Initiation Protocol", en.wikipedia.org, last modified Oct. 26, 2006.
"Voice Over IP", www.samhassan.com, no later than Nov. 5, 2006.
Jaehoon Jeong et al., "Dynamic Tunnel Management Protocol for IPv4 Traversal of IPv6 Mobile Network", www-users.cs.umn.edu/~jjeong/publications/international-conference/vtc2004-fall-nemo-jaehoon.pdf, no later than Mar. 2, 2007.
Nin-Jain Shin et al., "Using MPLS-Based Dynamic Tunnel for Location Control and QoS Management in Wireless Network", www.ndhu.edu.tw/~rdoffice/exchange/abroad/abroad95/WTY_paper.pdf, 2006.
Thierry Ernst, Keiichi Shima (eds), "Nautilus6 Project Activity Report in 2005", member.wide.ad.jp/tr/wide-tr-nautilus6-report2005-01.pdf, Feb. 10, 2006.
Statement of John Ogilvie, Aug. 3, 2010, pp. 1.
Notification of Identification of Prior Art in Late Protest Under 37 C.F.R. § 1.291, mailed Jul. 20, 2010, pp. 1.
Daren French, "Protest", USPTO stamped Feb. 12, 2010, pp. 2.
Notification of Identification of Prior Art in Late Protest Under 37 C.F.R. § 1.291, mailed Aug. 3, 2010, pp. 2.
Ronald B. Thomas, Ecessa Corporation, "Pending Patent Protest Letter", USPTO stamped May 17, 2010, pp. 2.

* cited by examiner

VOIP MULTILINE FAILOVER

RELATED APPLICATIONS

This application incorporates all material in, and claims priority to, the following U.S. provisional patent applications: Ser. No. 60/863,378 filed Oct. 29, 2006; Ser. No. 60/866,934 filed Nov. 22, 2006; and Ser. No. 60/891,920 filed Feb. 27, 2007.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND

"VoIP" and "VOIP" stand for Voice over IP (Internet Protocol). VoIP technology (hardware and/or software) can be used to transmit voice conversations over a data network using the Internet Protocol. The data network may be the internet, another WAN (Wide Area Network) or a corporate intranet, for example. VoIP is also called "IP telephony". VoIP may refer specifically to the ability of an IP network to carry telephone voice signals as IP packets in compliance with International Telecommunications Union Telecommunication Standardization Sector (ITU-T) specification H.323, IAX, SIP or any other protocol. In some cases, VoIP enables a router to transmit telephone calls and faxes over the internet with no perceived loss in functionality, reliability, or voice quality.

VoIP works by sending voice information in digital form in packets, rather than in the traditional circuit-committed protocols of the PSTN (Public Switched Telephone Network). One common advantage of VoIP is that the telephone calls over the internet do not incur a surcharge beyond what the user is paying for internet access, much as the user doesn't pay extra for sending individual e-mails over the internet. VoIP offerings typically require a fixed monthly fee for unlimited long distance services. Thus, VoIP can be significantly less expensive than other telephone long distance packages. One high speed internet connection may also provide service for multiple phone lines. Some organizations use VoIP internally over WAN links between geographically separated offices to reduce telephony service costs.

Other related concepts will be known or apparent through other sources, not least of which are references such as those of record in the present patent application.

SUMMARY

The present invention provides tools and techniques for VoIP communications. Some embodiments include a method with the steps of receiving a user request to initiate a telephonic connection from a local site using a VoIP telecommunication device which has no link failover functionality; establishing over wide area network links at least two tunnels between a controller at the local site and another controller; and transmitting VoIP traffic over at least one of the tunnels from the controller at the local site to the other controller. Some embodiments dynamically establish one or both of the tunnels in response to receiving the user request, whereas in some embodiments one or both of the tunnels are static, that is, they are established before receiving the user request. Some embodiments include more than two tunnels. In some cases, at least one of the tunnels is call-specific, namely, dedicated to VoIP traffic.

If a tunnel being used to carry VoIP traffic fails, the failure is detected and the invention changes the data path during the call to transmit packets over at least one non-failed tunnel. Some embodiments identify VoIP packets and send them into a tunnel while performing quality of service control, e.g., while committing minimum latency, jitter and packet loss as specified. Some embodiments perform network address translation (NAT) on packets before the controller at the local site sends them over the tunnel, such that an intermediate site sees a public IP address for the local site in the packets instead of seeing a private IP address of the local site. VoIP calls may go through a PBX/soft-switch at an intermediate site and then terminate on a VoIP device or on a PSTN device. In addition to such methods, similar systems, configured computer-readable media, process products, data structures, signals, and other embodiments can also be provided according to the present invention.

However, these examples are merely illustrative. The present invention is defined by the claims, and even though this summary helps provide a basis for claims, to the extent that this summary includes more features, omits features, or otherwise conflicts with the claims that are ultimately granted, those claims should prevail.

DRAWINGS

To illustrate ways in which advantages and features of the invention can be obtained, a description of the present invention is given with reference to the attached drawings. These drawings only illustrate selected aspects of the invention and thus do not fully determine the invention's scope.

DETAILED DESCRIPTION

Introduction

The present invention provides tools and techniques for highly reliable VoIP communications. The invention is illustrated in discussions herein and in the drawing figures by specific examples, but it will be appreciated that other embodiments of the invention may depart from these examples. For instance, specific features of an example may be omitted, renamed, grouped differently, repeated, instantiated in hardware and/or software differently, performed in a different order, or be a mix of features appearing in two or more of the examples.

Definitions of terms are provided explicitly and implicitly throughout this document. Terms do not necessarily have the same meaning here that they have in general usage, in the usage of a particular industry, or in a particular dictionary or set of dictionaries. The inventors assert and exercise their right to be their own lexicographers, with respect to both coined and other terms. In particular, and without ruling out other lexicography examples, certain acronyms and other terms are used herein as indicated below.

Some Acronyms and Other Terms

AH: IP Authentication Header, part of a VPN protocol.

Call-Specific Tunnel: The term "call-specific tunnel" does not mean that a tunnel is necessarily dedicated to a particular call (namely, a tunnel is created for a call, and broken down at the end of that call, then a new tunnel is created for next call). Rather, a "call-specific tunnel" is a tunnel used specifically for VoIP calls, that is, a tunnel which does not carry any significant amount of non-VoIP traffic. Such a significant amount could be 5% of the packets in one embodiment, or 1% of packets, for instance, in another embodiment, as defined by the level of dedication specified by an administrator, vendor, or user.

A channel is a path to a peer.

ESP: Encapsulating Security Payload, part of a VPN protocol.

FP_REQ, FP_RESP: FatPipe Request packet, FatPipe Response packet, may be used in establishing dynamic tunnel for communications over an IP network.

GRE: Generic Routing Encapsulation protocol.

IP: Internet Protocol, a protocol used on the internet; nodes on the internet or other networks using IP which have IP addresses as traffic source and/or destination identifiers.

IPVPN: trademark of FatPipe Networks, for communications connectivity software and hardware used, e.g., with multiple managed VPN providers.

LAN: Local Area Network, a geographically small network, such as one used by a single business, institution, or other entity.

MLIP: See RLIP.

MPSec or MPSEC: trademark of FatPipe Networks, for communications connectivity software and hardware used, e.g., to establish redundant networking connections.

RLIP: FatPipe Networks term for Remote Location IP address, e.g., RLIP1 corresponding to WAN1 is IP of that Remote Location, RLIP2 is WAN2 IP of the Remote Location. MLIP is the FatPipe Networks term for Main Location IP address, e.g., MLIP1 is WAN1 IP of Main Location, MLIP2 is WAN2 IP of Main Location.

A router is a device which routes packets between various IP subnets.

RTP: Real-Time Transport Protocol, a protocol usable with IP networks.

SIP: Session Initiation Protocol, a signaling protocol for internet telephony.

IAX: Inter Asterisk Exchange Protocol

H.323: ITU Telecommunication Standardization Sector (ITU-T), that defines the protocols to provide audio-visual communication sessions on any packet network A tunnel is a path to a peer through the internet, another WAN, or another third party medium. For example, to connect an office to a home through a VPN one might create a VPN tunnel. Channel and tunnel are synonyms for a path to a peer, except that a tunnel passes through a third party medium, such as the internet.

VoIP or VOIP: Voice over IP, a protocol for voice communications over an IP network such as the internet.

VPN: Virtual Private Network, technology for secure communications within a public network such as the internet.

WAN: Wide Area Network, such as the internet, or another large network such as a metropolitan area network; used in contrast to LAN.

Xtremed: a FatPipe Networks program interfacing between a user space program and kernel modules in a FatPipe Networks box. This program interfaces with a Graphical User Interface (GUI) to accept user configurations. It also stores/retrieves configuration information from persistent files. In FatPipe Networks boxes, the kernel module is called xm and it is the one which actually forwards packets between the various WAN interfaces. Of course, different embodiments can use programs named differently than FatPipe Networks' box, and implemented differently, to accept user configurations, and to forward packets between WAN interfaces as claimed herein.

SBC: Session Border Controller

Methods and More

Figure 1:
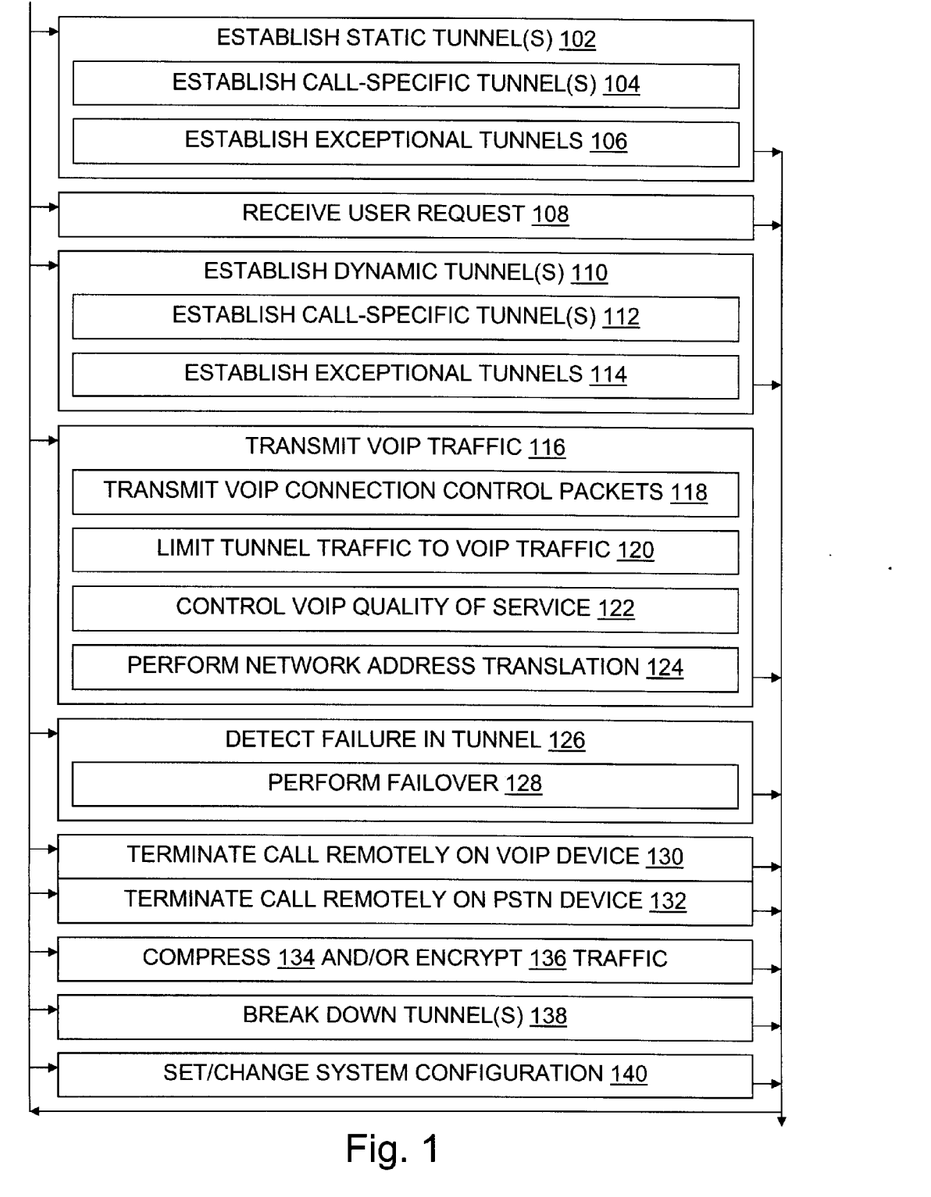
FIG. 1 is a flow chart illustrating methods for VoIP communication according to at least one embodiment of the present invention.

FIG. 1 is a flowchart illustrating methods of the present invention for VoIP communications, and the steps illustrated therein will now be discussed. Note, however, that other drawings and discussion of other embodiments herein may also aid understanding of method embodiments, just as an understanding of methods will sometimes aid understanding of system or other non-method embodiments. Accordingly, reference is made here not only to FIG. 1 but also to other figures.

Figure 2:
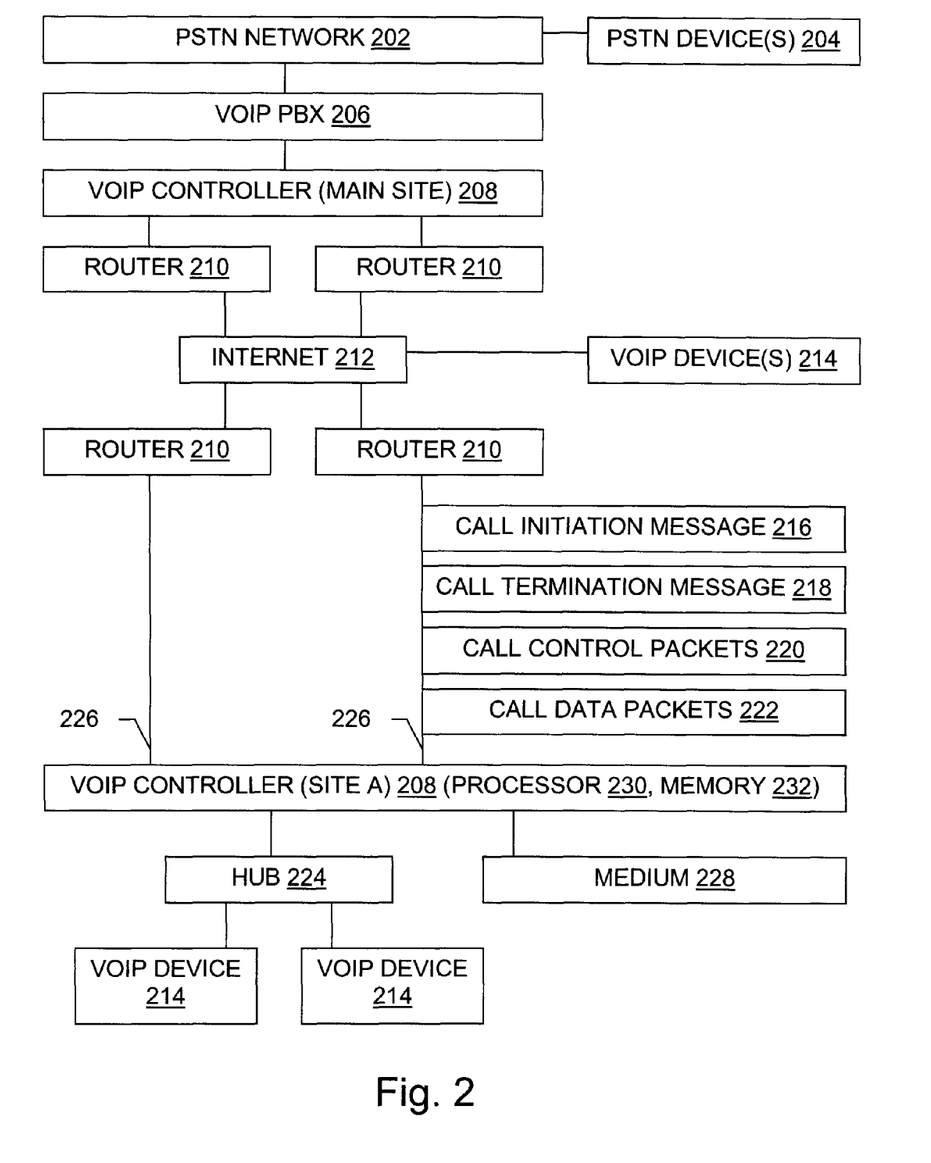
FIG. 2 is a block diagram illustrating devices, data, systems, methods, and other aspects of some embodiments of the present invention.
Figure 3:
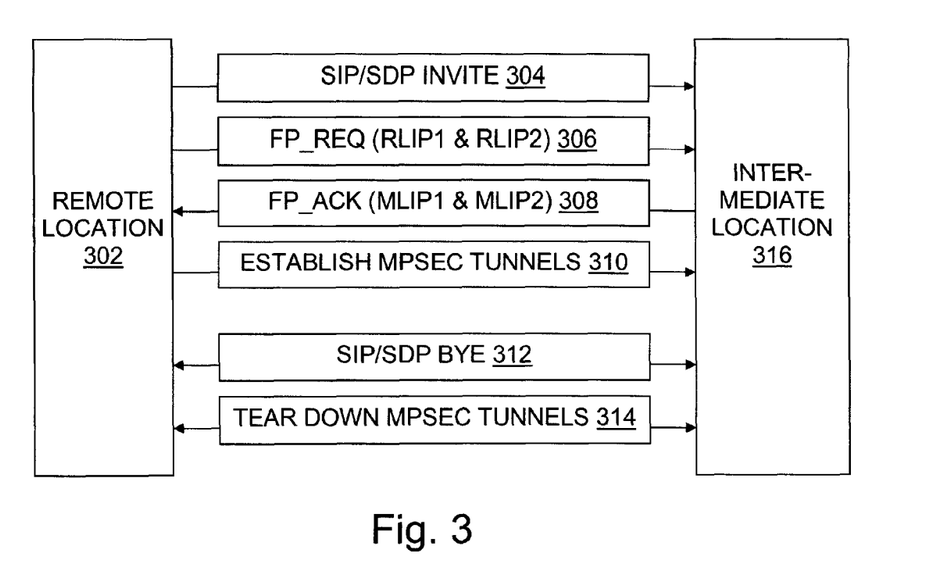
FIG. 3 is a block diagram illustrating aspects of some embodiments of the present invention for establishing tunnels and for tearing down tunnels between two locations.
Figure 4:
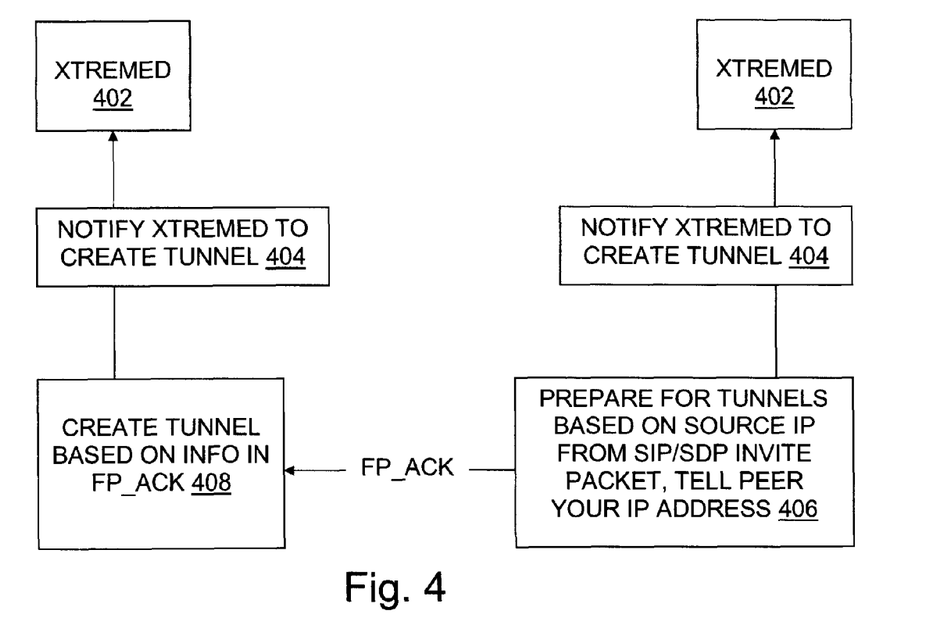
FIG. 4 is a block diagram further illustrating aspects of some embodiments of the present invention for establishing tunnels.

During a static tunnel establishing step 102, an embodiment establishes a tunnel between a first VoIP controller 208 at a first site (e.g., "site A" in FIG. 2) and a second VoIP controller 208 at some geographically remote site (e.g., the "intermediate site" noted in FIG. 2). The static tunnel may be established, for instance, when the system is booted or powered on. Such a static tunnel 226 may include at least two physically separate data channels over the multiple wide area network 212 links, and it may provide redundant VoIP connectivity using a VoIP telecommunication device 214 which has no link failover functionality. In some embodiments, tunnels are established 102 using known approaches, while in other embodiments proprietary approaches such as those discussed below in connection with FIGS. 3 and 4 are used. Regardless, in some embodiments the VoIP device 214 for which the tunnels are established need not have any built-in failover capabilities, and need not be provided by a particular vendor (e.g., they need not be provided by the VoIP controller 208 vendor or by a PBX vendor).

A tunnel 226 is a data channel which carries data over a wide area network. In general, when two tunnels are established they may carry data packets over geographically different paths. Tunnels 226 may be static or dynamic, and they may be call-specific or not. As used herein, a static tunnel is one established 102 before the embodiment receives 108 a user request resulting in use of the tunnel to VoIP traffic for the user, whereas a dynamic tunnel is one established 110 in response to such a request. A static tunnel may be used to carry 116 traffic for several successive VoIP calls, by one or more users, whereas a dynamic tunnel will typically be broken down 138 after completion of the call for which it was created 110. In case of multiple calls, a tunnel will be created for the first call and deleted after the completion of the last call. A call-specific tunnel is one that only carries VoIP traffic (or one that does not carry a significant amount of other traffic), whereas a tunnel that is not call-specific may carry significant amounts of other types of traffic as well as VoIP traffic.

FIG. 1 illustrates multiple embodiments, and a given commercial product may well omit some of the steps shown in FIG. 1. For instance, it might establish 110 dynamic tunnels but not establish 102 static tunnels. It might establish 104 only call-specific static tunnels. It might establish 106, 114 tunnels which are exceptional (as that term is used herein) in some way, e.g., tunnels established using MPSEC or other proprietary technology, established through a VPN, and/or established with complete physical separation between them.

During a transmitting step 116, VoIP traffic is transmitted over at least one of the tunnels 226. This may include transmitting packets that contain VoIP data, transmitting 118 packets that control the VoIP connection status, and transmitting 122 packets that control the quality of service of the VoIP connection. In some embodiments, the tunnel is dedicated 120 to VoIP traffic, while in other embodiments the tunnel is not dedicated to VoIP but instead can also carry (or else must also carry) a significant amount of non-VoIP traffic. In some embodiments, VoIP traffic is compressed 134 and/or encrypted 136, either before it reaches the first controller 208 or within that controller 208 before it is placed in the WAN portion of the tunnel 226.

The call might connect 130 one VoIP phone to another VoIP phone, or the call might connect 132 a VoIP phone to a conventional (PSTN) phone. That is, a configuration according to the invention might have a PBX/soft-switch 206 at an intermediate site, allowing call termination 130 on a VoIP device 214 and/or allowing call termination 132 on a PSTN device 204. In some embodiments a system according to the invention provides a VoIP connection between a VoIP phone 214 and a regular PSTN (public switched telephone network, aka plain old telephone service or POTS) phone 204. A user could have a call from a VoIP phone to a cell phone or to a PSTN phone, with a conversion device in between. This was implemented in a FatPipe Networks prototype; a PSTN PBX device 206 at a VoIP provider did the conversion.

In some cases, the tunnel 226 which originally carries the call will continue to provide an acceptable quality of service throughout the entire call. After all the calls end normally, dynamic tunnels are broken down 138 to release resources for other use. However, in other instances the tunnel will partially or entirely fail. Some embodiments detect 126 partial or complete failure and perform 128 failover to transfer VoIP traffic onto one or more backup tunnels 226.

In some embodiments, the tunnel failure can be detected 126 within one to three seconds after it occurs. The maximum acceptable channel failure detection time may be defined, depending on the embodiment, by an end user, by a network administrator, by both, by the embodiment vendor, or in some other manner. In a prototype of the invention, the time set for failover was three seconds, that is, a channel down was detected within three seconds. A goal is to reduce that to one second in a commercial embodiment. Channel detection failure time is limited by hardware and by the response time of the line. If the response time is fast enough, one could possibly detect channel failure in one second or less. However one might then run into the issue of line flapping (lines going up and down rapidly and resulting in lots of failover) and false failure detection due to simple data loss in the line. Once channel failure was detected 126, the switchover time was minimal, as the channels 226 were already established when a call was made and little time was needed to re-route the packets to the backup channel 226 during failover 128. For the prototype, the exact number of packets lost was not determined, but each call occupied around 30 kps so with a three second loss, one can estimate that at most 90 kb of information 222 would be lost. This data loss could vary depending on the type of compression 134 and line throughput; people can much data 222 or relatively little data. A three second silence during a telephone conversation is not unusual.

Thus, some embodiments of the invention provide a communications method, including receiving 108 a user request to initiate a telephonic connection from a local site 302, using a VoIP telecommunication device 214 which has no link failover functionality; establishing 102, 110 over wide area network 212 links at least two tunnels between a controller 208 at the local site and another controller; and transmitting 116 VoIP traffic over at least one of the tunnels from the controller at the local site to the other controller. The WAN links 226 could be physically separated, or they could be multiple channels on the same line. However, in some embodiments they are not merely data channels in a single channelized T1 or T3 line because that does not provide the desired redundancy.

In some embodiments, the method establishes 102 at least one of the tunnels 226 as a static tunnel before receiving 108 the user request. In some, however, the method dynamically establishes 110 at least one of the tunnels in response to receiving the user request. The step of dynamically establishing 110 a tunnel may include the controller at the local site sending, transparently to the user, at least the following to the other controller: a VoIP call initiation message 216, a primary channel IP address 308, at least one backup channel IP address 308. Transparently means transparently to the end user; a network administrator will normally notice or be informed of the line failure 126, and might be notified after call failover 128 occurs. The controller 208 at the local site may send 138 the other controller a VoIP call termination message 218, and tear down 138 the dynamically established tunnel.

As noted, in some cases the invention detects 126 a failure of the tunnel during a call and changes 128 a data path during the call to transmit packets over at least one non-failed tunnel 226. The step of detecting 126 failure of the tunnel during a call may occur within a previously defined time period of the physical failure of the tunnel.

In some cases, an embodiment identifies VoIP connection control packets 220 and sends 118 them into the tunnel. This may include identifying VoIP packets and sending them into a dynamically established call-specific tunnel 112 while excluding 120 non-VoIP packets from the tunnel. VoIP signal packets and VoIP media packets are examples of connection control packets 220. An SIP/SDP packet 304, 312 is an example of a VoIP signal packet. A packet 222 carrying VoIP user data is an example of a VoIP media packet. VoIP user data includes voice, video, and/or other data. Depending on the embodiment and the protocols used, VoIP packets might be identified for call-specific tunnels 226 at OSI network layer 2, layer 3, or layer 7, for example. VoIP protocols like RTP and SIP require an ability to inspect layer 7 format, as layer 3 and layer 4 information is not always sufficient to identify the packet as SIP/RTP. A prototype of the invention marked packets which matched an RTP/SIP pattern, so they would be tunneled 226 in the prototype.

An embodiment may identify VoIP packets and send them into a dynamically established tunnel 110 while committing 122 minimum latency, jitter and packet loss as previously specified for improved quality of call. An embodiment may identify VoIP packets and send them into a call-specific tunnel 104, 112 while committing 122 minimum latency, jitter and packet loss as previously specified for improved quality of call. An embodiment vendor, an end user, and/or a network administrator could specify acceptable levels or ranges for latency, jitter, and/or packet loss. These could be dynamically adjusted during use of the embodiment.

In some embodiments, transmitting 116 packets includes performing 124 network address translation (NAT) on packets before the controller 208 at the local site 302 sends them over the tunnel, such that the intermediate site 316 sees a public IP address for the local site in the packets instead of seeing a private IP address of the local site. A prototype of the invention first NATed the packets on a public IP address and then tunneled the packets to the main office. Accordingly, the main site only saw the public IP address of the remote site.

In some cases the step of dynamically establishing 112 a call-specific tunnel occurs when no such tunnel exists. In other cases, it occurs 112 when an existing call-specific tunnel 226 is at or near carrying capacity. The number of calls a tunnel 226 can hold at one time is dependent on the WAN 212 interface (e.g., redundant channel within the tunnel(s)) having the lowest bandwidth of the redundant channels of the tunnel, at least in embodiments in which all packets 222 of a given call must be able to go through that smallest channel in case of failover 128. In some embodiments, multiple tunnels are created after the system boots up. Then a pre-defined number of calls are allocated per tunnel. In some embodiments, a tunnel is created 110 for the first call after the system boots, and then a pre-defined number of calls are allocated to that tunnel. Additional tunnels are created 110 for any calls requested after that first tunnel is full. Some embodiments allow a backup tunnel 226 to have smaller capacity than the primary tunnel (the tunnel 226 initially used), while other embodiments do not.

In some embodiments, a call is never in more than one tunnel 226 at a time. Between the local and remote sites, there is only one tunnel (having two or more separate channels) at a given time, and all calls between the sites during that tunnel's life will use that tunnel. The tunnel will be established when a VoIP call initiation message 216 is received 108 on the local site and there is no pre-established tunnel between the local and remote site. The tunnel will be torn down 138 on receiving the VoIP call termination message for the last call on the tunnel. The network structure is multiple local sites connecting to one main site which holds the PBX 206, so the main site will have one tunnel connecting to each of its remote sites, in a hub and spoke arrangement, in these embodiments.

FIGS. 3 and 4 illustrate particular methods and systems of the invention for VoIP communication between an intermediate location 316 and a remote location 302. During tunnel establishment 110, SIP/SDP invite messages 304 are sent 118 from the remote location to create tunnels 226 to the intermediate location 316. Specifically, in the prototype FatPipe xtremed software 402 at the remote location notified 404 xtremed software 402 at the intermediate location 316 to create a tunnel. An FP_REQ message 306 was sent 118, indicating a source IP address and other configuration information 406. In normal operation, this resulted in a corresponding FP_ACK message 308. Then MPSEC tunnels 226 were established 110, 310 based on 408 the information in the FP_ACK message. Call data packets 222 were transferred, carrying VoIP data. Failover was performed 128 if necessary. After the call was ended by one or both users, SIP/SDP messages 312 were sent and the dynamic MPSEC tunnels were torn down 314, 138.

A SIP/SDP Invite message 304 is an example of a VoIP call initiation message 216. Other examples of VoIP call initiation messages 216 include messages used by the H.323 and IAX standard to initiate VoIP calls, and similar messages used by proprietary protocols. A SIP/SDP initiation message (for instance) need not be generated by the controller 208; it can be generated by a VoIP phone 214 and then be forwarded by the controller. Some embodiments use ICMP packets to establish 110 dynamic tunnels, in order to establish more than one tunnel 226.

A SIP/SDP Bye packet 312 is an example of a VoIP call termination message 218. Other examples of VoIP call termination messages 218 include messages used by the H.323 standard to terminate VoIP calls, and similar messages used by proprietary protocols. A SIP/SDP termination message (for instance) need not be generated by the controller 208; it can be generated by a VoIP phone 214 and then be forwarded by the controller.

In some embodiments, a tunnel 226 is torn down 138 when a call ends and no other VoIP call currently passes through the tunnel. Thus, for multiple simultaneous VoIP calls only the first call will establish 110 the tunnel (using, e.g., a SIP/SDP Invite message) and the tunnel will be removed 138 only when the last call ends (using e.g., a SIP/SDP Bye Message).

Although reference is made above to xtremed 403 software, other software having the claimed and required functionality may be used, as may firmware, hardware, and combinations thereof. Xtremed is the name of a program in FatPipe Networks boxes 208, to which FatPipe Networks' MPSEC software is an add-on module. DMPSEC (MPVoIP functionality) will be another add-on module to MPSEC software, in a FatPipe Networks implementation embodying the present invention. Other authorized embodiments may use different software architectures, different program and other component names, and to some extent, different functionality. The functionality needed in a given embodiment may include, e.g., statically establishing 102 tunnels and/or dynamically establishing 110 tunnels, transferring 116 VoIP packets over them (possibly compressed 134 and/or encrypted 136), detecting 126 tunnel failure by timeout or signal loss for example, and performing 128 failover by modifying routing information such that packets travel over one or more backup tunnels 226 with little or no user-perceived loss of call quality.

More Regarding "No Link Failover Functionality"

The present invention provides methods and systems to enable VoIP service providers to provide a redundant VoIP system with almost any user equipment. This is reflected in the claim requirement that the VoIP telecommunication device 214 has "no link failover functionality".

It is believed by the inventors that some vendors, such as Cisco and Avaya, who sell both VoIP phones and VoIP soft switches (PBX, proxy server etc), use a proprietary protocol so that their VoIP phones are effectively locked, in the sense that the phones communicate fully (if at all) only with that vendor's VoIP soft switches. Examples include Vonage phones and possibly also some extended Cisco enterprise phones. More generally, if the intelligence to provide redundancy/failover "on call" (during a call) is part of a VoIP phone, then the phone is part of an end-to-end solution, as both the phone and the switches it communicates with should understand this redundancy/failover protocol in order to provide failover. It is believed by the inventors that there is no standard SIP/RTP protocol or other VoIP standard to provide redundancy/failover generally, much less to specify on-call failover. Accordingly, a given vendor may provide redundancy/failover in its proprietary end-to-end way on both its phones and its switches. This proprietary situation creates an opportunity for embodiments of the present invention to enable VoIP service providers to provide a redundant VoIP system with user phone equipment 214 which lacks such proprietary link failover functionality.

Some embodiments of the invention are (or include) controller appliances 208 for use in a VoIP provider market in which the remote device 204 and the PBX 206 are part of (or are accessed through) the provider network. A similar market for some embodiments is large organizations with branch offices 302 and a PBX 206 at a central location 316, with static tunnels 226. Such inter-office communication may provide VoIP connectivity which is controlled by devices 208 residing purely within the organization's own office network. Even in this case, the embodiments can include 104 call-specific tunnels (e.g., VoIP traffic is identified and marked or otherwise directed over a tunnel dedicated to VoIP traffic), and/or seamless failover 128 for voice calls between offices.

Systems and More

FIG. 2 illustrates some system embodiments of the present invention, and their larger context. VoIP telecommunication devices 214 may include fixed location phones, mobile phones, VoIP-enabled computers, pagers, fax machines, personal digital assistants, laptops, and other computing devices which can send and/or receive VoIP traffic. In the illustrated embodiment, VoIP devices 214 are connected through a conventional hub 224 to VoIP controller 208 according to the invention. In some embodiments, the devices 214 themselves lack failover functionality, in the sense that they can also be used without a controller 208 in a configuration which lacks failover capability and is not an embodiment of the present invention. The failover capability of the present invention relies primarily or solely on the controller 208, not on the phone 214. The VoIP controller 208 at a given site (e.g., site A) connects to two or more conventional routers 210 to support two or more tunnels 226 through the internet 212 and/or another WAN to other routers 210 and hence to another VoIP controller 208 at some other site (e.g., a company's main office site). As discussed above, various types of traffic 216, 218, 220, 222 travel through at least one of the tunnels.

The configuration shown in FIG. 2 is not the only possible configuration. For instance, more than two sites may be connected for VoIP communications according to the invention. Also, it is not necessary in every embodiment for one of the sites connected by the invention to also connect with a PSTN 202. Also, the routers 210 shown as separate devices in FIG. 2 could be provided in single box that contains both VoIP controller 208 functionality and router 210 functionality.

Another possible configuration embodying the invention is shown in a figure titled "MPVOIP Setup Diagram" on page A-8 of the underlying priority U.S. provisional patent application No. 60/866934 filed Nov. 22, 2006. For convenience, an updated version of that configuration will now be described, bearing in mind that this is merely another example, and that features of this example are not necessarily required in every embodiment of the present invention.

A PSTN network connects to a VoIP PBX 206 with SBC support which has IP address 67.107.195.1. This VoIP PBX connects to a main site VoIP controller 208 which has the following characteristics: WAN1 IP 6.0.0.2/30, GW 6.0.0.1, WAN2 IP 7.0.0.2/29 GW 7.0.0.1, LAN IP 192.168.0.211/24. The main site VoIP controller 208 connects to a router 210 at IP address 6.0.0.1 and to a router 210 at IP address 7.0.0.1. These two routers 210 connect to the internet 212. A proxy IP address for all VoIP phones in this configuration is 67.107.195.1. Also connected to the internet 212 are three VoIP phones 214, at addresses 22.33.44.55/32, 33.44.55.66/32, and 55.66.77.88/32, respectively.

Two routers 210 for a site A connect to the internet 212, at IP addresses 4.0.0.1 and 5.0.0.1, respectively. These two routers 210 connect to a site A VoIP controller 208 which has the following characteristics: WAN1 IP 4.0.0.2/30, GW 4.0.0.1, WAN2 IP 5.0.0.2/29 GW 5.0.0.1, LAN IP 172.16.0.1/24. The site A VoIP controller 208 connects to a hub 224, which connects to two VoIP phones 214.

Two routers 210 for a site B also connect to the internet 212, at IP addresses 2.0.0.1 and 3.0.0.1, respectively. These two routers 210 connect to a site B VoIP controller 208 which has the following characteristics: WAN1 IP 2.0.0.2/30, GW 4.0.0.1, WAN2 IP 3.0.0.2/29 GW 3.0.0.1, LAN IP 172.17.0.1/24. The site B VoIP controller 208 connects to another hub 224, which connects to two more VoIP phones 214.

In the MPVOIP Setup Diagram one tunnel goes through the Site A box 208, router 4.0.0.1, router 6.0.0.1 and the Main Site box 208. Another tunnel goes through the Site A box 208, router 5.0.0.1, router 7.0.0.1 and the Main Site box 208. One tunnel goes between 4.0.0.1 and 6.0.0.1, and another goes between 5.0.0.1 and 7.0.0.1 for redundancy. In this configuration, the box 208 at Site A cannot connect two VoIP phones, such as one phone at a hub at Site A and another phone at 22.33.44.55/32, without going through the Main Site, because the tunnels are created between the remote site (A, B) and the main site. As a result, the VoIP phones in this configuration will have to be behind the controllers 208 in reference to the WAN 212.

The MPVOIP Setup Diagram shows a Main Site and two VoIP phone sites, but the invention may also be used, for instance, with a Main Site and more than two VoIP phone sites. The MPVOIP Setup Diagram shows two tunnels for VoIP calls, but the invention may use two or more tunnels on a given controller-to-controller segment of a call, e.g., a segment between site A and a main site.

In the MPVOIP Setup Diagram, the routers 210 connected between the VoIP controllers 208 (from, e.g., FatPipe Networks) and the internet may be standard routers. The box between the telephones 214 and the VoIP controller can be a hub 224 or a switch. The VoIP phones 214 can be configured for DHCP or for Static IP addressing. These VoIP phones 214 primarily communicate with the VoIP PBX 206. The VoIP controller 208 (which could be, e.g., a FatPipe Networks MPVoIP box) would act as a medium to carry the traffic between the VoIP phone and VoIP PBX sites on two or more separate tunnels (aka "channels"). There is not necessarily any particular difference between a VoIP phone 214 that hooks directly to the internet 212 (like the VoIP phone at 22.33.44.55/32) and a VoIP phone 214 that hooks into a hub 224 connected to the controller 208. Each, for example, may within itself lack any failover functionality.

Although the MPVOIP Setup Diagram shows land line phones, mobile phones 214 can also be used according to the present invention. In the internet domain, the phones can be wired VoIP phones 214 or WiFi/WiMax VoIP phones 214, for example. The VoIP PBX 206 switches the calls between internet 212 domain and the PSTN 202, which can terminate on a wired phone 204 or a cellular network phone 204.

In the MPVOIP Setup Diagram, a typical data packet may take various paths during a VoIP call between Site A and Site B even if there is no failover 128, since the packet travels over the internet 212. In that embodiment, the calls are switched through the VoIP PBX+SBC (Session Border Controller) box 206, so packets traverse through the main site.

FatPipe Networks sells an existing MPSEC product, which establishes static tunnels. The existing product could be used, e.g., to establish 102 static tunnels between a main site and two remote sites that can route all traffic between the remote site offices. However, in some embodiments the VoIP controller 208 can dynamically establish 110 tunnels between the offices selectively for VoIP traffic. Other traffic between the sites can still traverse outside the tunnel. Dynamic tunnels are created 110 for a call (session) and taken down 138 when the call (session) ends, as opposed to static tunnels that can carry multiple user sessions during their existence.

A prototype of the present invention has been implemented and used internally by FatPipe Networks for experimentation such as testing and development. The prototype was first up and running on or about Sep. 20, 2006. In the prototype, two tunnels are established for a given phone call, but only one of them is used unless there is a need for failover to the other one. Either tunnel could be used as the primary, that is, the tunnel which is used to carry data initially. The other tunnel is used in the prototype only if the primary tunnel fails, in which case failover 128 occurs and the call continues with little or no user-perceptible change in quality. In this prototype version of the software, all VoIP traffic is carried 116 on the primary tunnel 226 and the other tunnel 226 is used only as backup, based on the user configuration. But it is contemplated that in the next version, traffic can be sent on both the channels in failover or redundancy mode.

The present invention also contemplates establishing two tunnels 226, putting some of the phone call's traffic on one and the rest of the traffic on the other, and then moving 128 all the traffic to the remaining tunnel if one of the tunnels fails. That is, instead of using only one of the tunnels, an embodiment of the invention may use both of them, but still do failover 128 if needed. Similarly, three or more tunnels 226 may be used, with VoIP traffic being carried over them all initially, or in other cases, being carried only over a proper subset of them initially, and with failover 128 to remaining tunnels in the event(s) one or more tunnels fail.

Embodiments of the invention can be used in conjunction with existing VoIP services, for example, those which provide IP-to-PSTN-network communications using VoIP PBXs 206, and in that sense, such embodiments do not provide a complete VoIP solution but instead act as a medium to carry 116, 128 the traffic on multiple channels in order to increase the reliability of the VoIP call. Embodiments of the invention may use existing MPSEC technology, or other technology, for compression 134 and/or GRE encryption 136. That is, the traffic within the dynamic VoIP tunnel can be compressed and/or encrypted, e.g., through GRE.

The MPVOIP Setup Diagram described above shows an embodiment in which the VoIP PBX 206 supports Session Border Controller software. Many existing consumer based VoIP PBXs have such support, e.g., to traverse seamlessly through the firewalls of customer networks serviced by the VoIP provider.

Whether a FatPipe Networks box 208 or some other VoIP controller 208 is used, in some embodiments the controller 208 identifies the VoIP session and communicates 118 the VoIP session and gateway capabilities between the sites, and does so on the fly as calls are set up 110. Thus, tunnels are dynamically created in response, directly or indirectly, to a customer dialing 108 a phone number, and are used solely for that phone call. Although reference is made to MPSEC tunnels 226, the underlying technology need not be the FatPipe Networks MPSEC technology. Whatever controller is used, it establishes the tunnels 226 (aka "channels") dynamically for VoIP traffic. Hence the term DMPSEC—Dynamic MPSEC, which was used in an underlying provisional application.

Some embodiments include a computer-readable storage medium 228 such as a flash memory, CD, DVD, removable drive, hard drive, RAM, ROM, EEPROM, PAL, ASIC, FPGA, or the like, which is configured to work in conjunction with a processor 230 and a memory 232 to perform a process as discussed herein for VoIP communications. A hard disk, RAM, tape, or other memory 232 may also be configured to serve as a computer-readable storage medium embodying the invention. It will be understood that method embodiments and configured media embodiments are generally closely related, in the sense that many methods can be implemented using code that configures a medium, and that many configured media are configured by code which performs a method. Those of skill will understand that methods may also be performed using hardwired special-purpose hardware which does not contain a ROM, PROM, EEPROM, RAM, or other memory medium embodying code that performs a method.

More about the Prototype

Documentation (text and graphics) prepared in conjunction with the prototype was made part of the underlying priority U.S. provisional patent application No. 60/866934 filed Nov. 22, 2006. For convenience, some of the information from that documentation is reproduced and updated here, bearing in mind that this is merely another example, and that features stated in this example are not necessarily required in every embodiment of the present invention.

The document is titled "Dynamic MPSec Tunnels For VoIP Design". An Introduction states: "This feature is required for customers who wanted redundancy for VoIP traffic. To achieve on failure for VoIP traffic, IPVPN tunnels between remote office and main office should be established, so that the call can failover on the backup tunnel when one of the tunnel breaks down, without dropping the call. An extension to the standard IPVPN has to be the tunnels should be established only when one or more calls are placed between the end locations and tore down when all the calls are completed." A section of Objectives for the product states "To provide redundancy to VoIP traffic seamlessly without dropping the call."

Next is a section of product requirements. Under User Requirements, the document states: "Ability to provide failure to VoIP traffic seamlessly without dropping the existing call." Under Functional Requirements, the document states: "Establish on-demand MPSec tunnels, Primary and backup for VoIP traffic between fatpipe end points (remote and main). All traffic, SIP and RTP should be tunnelled between the fatpipe boxes. If the existing tunnel breaks, the traffic should be redirected on the backup tunnel. Teardown the tunnel at the end of the call and if there are no more calls between the fatpipe end points." Under System Requirements, the document states "Ability of Fatpipe box at main location to establish and delete tunnels with 1 or n remote location fatpipe boxes. The main office can have n number of interfaces, while the remote office can have m<n interface. But each of the remote location will establish 2 or more tunnels with the main office." In the terms of the present patent document, the "fatpipe boxes" are embodiments of controller 208.

Next is a section titled "Design". Under Configuration, a subsection titled GUI states "'Select Protocol' can support only VoIP for now. 'WAN Interface List' The first entry is the Primary and the following are for backup tunnels. But at any point of time only 2 tunnels will be created." Under a subsection titled UI-PROTO, in text which relates here to setting 140 system configuration, the document states:

```
GET_POLICY_ROUTE
DATA:
int Index
int RuleType
FORMAT:
"%d|%d|%d\r\n"
DESCRIPTION:
Client requests a policy routing rule
SET_POLICY_ROUTE
DATA:
Int Index
Int RuleType
String Name
String SourceIPRange
String SourcePortRange
String DestIPRange
String DestPortRange
Int Protocol
```

```
Int TrafficMode
bool Webredirect
String QoSName
sequence(Int InterfaceNumber, Int IPNAT,Int PortNAT,
string NATAddressRange, string NATPortRange)
FORMAT:
"%d|%d|%d|%s|%s|%s|%s|%s|%s|%d|%d|%d|%s|%d,%d,%d,%s,%s|...\n"
DESCRIPTION:
Server responds to GET_POLICY_ROUTE
Index is the position of the rule in the list. Index starts from 1.
Name User assigned name.
SourceIPRange source IP addresses to match.
SourePortRange Source ports to match
DestIPRange Destination IP addresses to match.
DestPortRange Destination ports to match.
Protocol Numbers are as follows.
0 - All
1 - TCP
2 - UDP
3 - ICMP
4 - GRE
5 - ESP
6 - AH
7 - SIP_RTP
TrafficMode is either InterfaceSpecific or InterfacePriority
1 - InterfaceSpecific
2 - InterfacePriority
3 - Inbound
4 - Block
5 - DYN_MPSEC
Webredirect
0 - Disabled
1 - Enabled
QoSName is the name of an associated QoS rule, if there is one. Empty string
otherwise.
Interface Number is WAN interface index which starts from 2.
IPNAT
0 - Disable IP address NAT
1 - Enable IP address NAT
PortNAT
0 - Disable port NAT
1 - Enable port NAT
NATAddressRange an address or range of addresses to be
used for NATing
NATPortRange a port or range IPAddressRange pairs (source
and destination) can
be written in form of a subnet with a pair (IPAddress,
x.x.x.x/mask
where mask is number between 0 and 32, or in form of an
IP address
range with a pair. (IPAddressFirst , IPAddressLast):
x.x.x.x-x.x.x.x
PortRange can be a single number from 1 to 65535 or a
range written as x-y,
where x < y and 1 <=
ACK_SET_POLICY_ROUTE
DATA:
int Index
FORMAT:
"%d|%d\r\n"
DESCRIPTION:
Server acks SET_POLICY_ROUTE
```

Under a subsection titled XML Persistent Data, the document then states that the following are the changes to the fp_config.dtd file to include Dynamic MPSec tunnel information in the XML configuration file.

```
<!-- Elements - non-terminals -->
<!ELEMENT fp_config (interface+, load_balancing?, route_tests?,
static_route*,
policy_route*, qos_timeout*, mpsec?, failover?, account_policy)>
<!-- Attributes -->
<!ATTLIST protocol name (any | tcp | udp | icmp | gre | ah | esp |
sip_rtp)
#REQUIRED>
<!ATTLIST action type (inb | wan_to_wan | outb_is | outb_ip |
dyn_mpsec)
#REQUIRED>
```

The next section is titled Dynamic Tunnel Establishment Protocol. It includes two drawings, which are bases for FIGS. 3 and 4 of the present patent document. Reference numbers to FIGS. 3 and 4 have been added here, in noting that this section states: "The location 302 which initiates SIP/SDP INVITE will send FP_REQ (proprietary packet 306) with its Primary and Backup IP along with SIP/SDP INVITE packet 304 to the peer location 316. On receiving FP_REQ, it 316 would send a FP_RESP (proprietary packet 308) back to the node 302 with its own Primary and Backup IP address info and inform the user program (xtremed 402) to prepare for tunnel creation. The node that initiated connection on receiving a FP_RESP would inform 404 its user program (xtremed) to initiate a primary and backup tunnel. When a SIP/SDP BYE packet 312 is received by the node it would inform its user program (xtremed) to terminate the tunnels."

The next section is titled Implementation. A subsection titled Configuration Module states: "When a SET_DYN_MPSEC command is received from the GUI, update shared memory structure of both policy routing rule and mpsec, Add inbound policy route table entry the protocol (SIP), Configure dynamic mpsec entry for the policy route. When a GET_DYN_MPSEC command is received from the GUI, Retrieve the information from shared memory. When the box reboots configuration is retrieved from xml and Add inbound policy route table entry the protocol (SIP), Configure dynamic mpsec entry for the policy route."

A subsection titled User Configuration states:

```
enum action_type { //fpioctl.h
    ACT_BLOCK,
    ACT_FW_INB, /* inbound */
    ACT_FW_WTW, /* wan-to-wan */
    ACT_FW_OUTB_IS, /* outbound interface specific */
    ACT_FW_OUTB_IP, /* outbound interface priority */
    ACT_FW_BOUND_DEV,
    ACT_DYN_MPSEC /* Dynamic MPsec */
};
static int parse_proute_rule(struct sm_prr *prr)
{
    else if (num == 5) /* Dynamic Mpsec for SIP 04/05/06 */
    {
        prr->action.type = ACT_DYN_MPSEC;
        prr->pattern.chain = PAT_CH_LAN;
    }
}
```

A subsection titled Kernel Configuration follows. In the present context this subsection relates to establishing 110 dynamic tunnels 226 and also relates to call control packets 220. This subsection states:

```
struct action_ops act_ops[] = {
    { "FW_DYN_MPSEC", act_create_dyn_tunnels }
};
struct tcp_conn *act_create_dyn_tunnels (struct sk_buff *skb,
        struct rl_pattern *patt)
{
    fp_send_dyn_tunnel_req(patt);
    return *act_create_tab_outb_ip (skb, patt);
}
struct rl_pattern* rl_match(int plid, struct sk_buff *skb)
```

-continued

```
{
    check for SIP or RTP and assigned the general proprietary
    IPPROTO_SIP_RTP
        if(check_sip_session(skb) || check_rtp_session(skb) ||
    check_rtp_session_term(skb))
            proto = IPPROTO_SIP_RTP;
        else
            proto = iph->protocol;
}
unsigned char check_sip_session(struct sk_buff *skb)
unsigned char check_rtp_session(struct sk_buff *skb)
unsigned char check_rtp_session_term(struct sk_buff *skb)
```

A subsection titled Kernel TX and RX control Messages, which also relates to establishing 110 dynamic tunnels 226 and to breaking down 138 tunnels, then states:

```
enum DYN_PKT_TYPE {
    FP_DYN_TUNNEL_REQ=0,
    FP_DYN_TUNNEL_RESP,
    FP_DYN_TUNNEL_TEAR
};
unsigned char fp_send_dyn_tunnel_pkt(struct rl_pattern *patt, enum
DYN_PKT_TYPE type, struct dyn_construct packet;
    send_icmp_packet( );
}
int process_dyn_tunnel_pkt(struct sk_buff** pskb) {
    validate packet;
    if(FP_DYN_TUNNEL_TEAR){
        tear down the tunnel(vpn_ip);
        return;
    }
    if(FP_DYN_TUNNEL_REQ){
        fp_send_dyn_tunnel_resp( );
    }
    if(FP_DYN_TUNNEL_RESP) || (FP_DYN_TUNNEL_REQ) {
        add_vpn_out_fatpipe_port( )
        add_vpn_in_record( );
        tcp_session_attach_mpsec( );
    }
}
int del_dyn_tunnel(struct tcp_conn *tc)
{
    if sip_rtp session
        fp_send_dyn_tunnel_pk(FP_DYN_TUNNEL_TEAR);
    tear_down_tunnel(dst_ip);
}
int tear_down_tunnel(__u32 vpn_ip)
{
    tear down the tunnel associated with peer vpn_ip;
    tcp_session_dettach_mpsec(saddr, daddr);
}
struct tcp_conn* match_sip_session(u32 saddr, u32 daddr)
{
    return tcp entry for SIP control session, associated with the src and
dst addresses.
}
void tcp_entry_put(struct tcp_conn *t)
{
    for sip_rtp session set timeout interval to 5 secs
}
---++++ 5.1.3 Modifications to existing kernel functions
int packet_output(struct sk_buff **pskb)
{
    if INVITE packet (check_sip_session)
        fp_send_dyn_tunnel_pkt(FP_DYN_TUNNEL_REQ);
}
int fw_input_chain( )
{
    if (is_dyn_tunnel_ctrl_pkt( )) {
        process_dyn_tunnel_pkt( );
```

```
    }
}
int tcp_expire( )
{
    if(sip control session)
        del_dyn_tunnel(tc);
}
```

A subsection titled Session Identification is empty. It is followed by a subsection titled Tunnel Establishment XM Module. This subsection includes a diagram, showing fw_input_chain block left of and regarding two brief flowcharts. The first of these brief flowcharts has a rectangular block "INBOUND if rl_match exists" flowing into a diamond check_sip_invite( ), which flows on YES into a rectangular block send_fp_ack( ). The second of these brief flowcharts has a rectangular block "INBOUND if FP_ACK" which flows into a rectangular block create_dync_rdnc_tunnel( ). After the brief flowcharts in this section, a heading "Packet Format" is followed by "FP_REQ/FP_RESP/FP_BYE, Packet Type=FP_REQ/FP_RESP/FP_BYE, Src IP address, Src Network Mask, Dst IP address, Dst Network Mask".

Conclusion

Although particular embodiments of the present invention are expressly illustrated and described herein as methods, for instance, it will be appreciated that discussion of one type of embodiment also generally extends to other embodiment types. For instance, the descriptions of methods also help describe devices, configured media, and method products. Limitations from one embodiment are not necessarily read into another.

Embodiments such as the methods illustrated or corresponding systems may omit items/steps, repeat items/steps, group them differently, supplement them with familiar items/steps, or otherwise comprise variations on the given examples. Suitable hardware and software to assist in implementing the invention is readily provided by those of skill in the pertinent art(s) using the teachings presented here, available circuits, and available programming languages and tools.

The embodiments discussed are illustrative of the application for the principles of the present invention. Numerous modifications and alternative embodiments can be devised without departing from the spirit and scope of the present invention. Headings are for convenience only; information on a given topic may be found outside the section whose heading indicates that topic.

All claims as filed are part of the specification and thus help describe the invention, and repeated claim language may be inserted outside the claims as needed without violating the prohibition against new matter. Terms such as "a" and "the" are inclusive of one or more of the indicated item or step. In the claims a reference to an item means at least one such item is present and a reference to a step means at least one instance of the step is performed, in the absence of a clear indication that the item or step is optional, in which case it may be present/performed.

We claim:

1. A communications method, comprising:
receiving a user request to initiate a telephonic connection from a local site, using a VoIP telecommunication device which has by itself no functionality to failover to transfer traffic onto at least one backup tunnel in the event of a link failure;

establishing over wide area network links at least two VPN tunnels between a controller at the local site and another controller; and transmitting VoIP traffic over at least one of the VPN tunnels from the controller at the local site to the other controller;

wherein the establishing step includes an inviting location initiating an SIP/SDP INVITE at least in part by sending to an invited location an SIP/SDP INVITE packet and includes sending to the invited location a primary IP address of the inviting location and a backup IP address of the inviting location in a request packet, and includes the inviting location receiving from the invited location in a response packet a primary IP address of the invited location and a backup IP address of the invited location.

2. The method of claim 1, wherein the method dynamically establishes at least one of the VPN tunnels in response to receiving the user request.

3. The method of claim 2, wherein the step of dynamically establishing a VPN tunnel comprises the controller at the local site sending, transparently to the user, at least the following to the other controller: a VoIP call initiation message, a primary channel IP address, at least one backup channel IP address.

4. The method of claim 2, further comprising the controller at the local site sending the other controller a VoIP call termination message, and then tearing down the dynamically established VPN tunnel.

5. The method of claim 1, wherein the method establishes at least one of the VPN tunnels as a static tunnel before receiving the user request.

6. The method of claim 1, wherein the method establishes at least one of the VPN tunnels as a call-specific tunnel, namely, a tunnel that is dedicated to VoIP traffic.

7. The method of claim 1, wherein the method establishes at least two physically separate VPN tunnels of the same type (static versus dynamic).

8. The method of claim 1, further comprising detecting failure of the VPN tunnel during a call and changing a data path during the call to transmit packets over at least one non-failed tunnel.

9. The method of claim 8, wherein detecting failure of the VPN tunnel during a call occurs within a previously defined time period of the physical failure of the VPN tunnel.

10. The method of claim 1, wherein transmitting packets comprises identifying VoIP connection control packets and sending them into the VPN tunnel.

11. The method of claim 1, wherein transmitting packets comprises identifying VoIP packets and sending them into a dynamically established call-specific VPN tunnel while excluding non-VoIP packets from the VPN tunnel.

12. The method of claim 1, wherein transmitting packets comprises identifying VoIP packets and sending them into a dynamically established VPN tunnel while committing minimum latency, jitter and packet loss as previously specified for improved quality of call.

13. The method of claim 1, wherein transmitting packets comprises identifying VoIP packets and sending them into a call-specific VPN tunnel while committing minimum latency, jitter and packet loss as previously specified for improved quality of call.

14. The method of claim 1, wherein transmitting packets comprises performing network address translation (NAT) on packets before the controller at the local site sends them over the VPN tunnel, such that the intermediate site sees a public IP address for the local site in the packets instead of seeing a private IP address of the local site.

15. The method of claim 1, further comprising a PBX/softswitch at an intermediate site terminating the call on a VoIP device.

16. The method of claim 1, further comprising a PBX/softswitch at an intermediate site terminating the call on a PSTN device.

17. A communications method, comprising:
receiving a user request to initiate a telephonic connection from a local site, using a VoIP telecommunication device which has by itself no functionality to failover to transfer traffic onto at least one backup tunnel in the event of a link failure;

dynamically establishing at least two tunnels over wide area network links between a controller at the local site and another controller, in response to receiving the user request; and transmitting VoIP traffic over at least one of the tunnels from the controller at the local site to the other controller;

wherein the establishing step includes an inviting location initiating an SIP/SDP INVITE at least in part by sending to an invited location an SIP/SDP INVITE packet and includes sending to the invited location a primary IP address of the inviting location and a backup IP address of the inviting location in a request packet, and includes the inviting location receiving from the invited location in a response packet a primary IP address of the invited location and a backup IP address of the invited location.

18. The method of claim 17, wherein the method also encrypts and/or compresses VoIP traffic.

19. A communications method, comprising:
receiving a user request to initiate a telephonic connection from a local site, using a VoIP telecommunication device which has by itself no functionality to failover to transfer traffic onto at least one backup tunnel in the event of a link failure;

establishing at least two call-specific tunnels over wide area network links between a controller at the local site and another controller, in response to receiving the user request; and transmitting VoIP traffic over at least one of the tunnels from the controller at the local site to the other controller;

wherein the establishing step includes an inviting location initiating an SIP/SDP INVITE at least in part by sending to an invited location an SIP/SDP INVITE packet and includes sending to the invited location a primary IP address of the inviting location and a backup IP address of the inviting location in a request packet, and includes the inviting location receiving from the invited location in a response packet a primary IP address of the invited location and a backup IP address of the invited location.

20. The method of claim 19, wherein the method dynamically establishes the tunnels in response to receiving the user request.

* * * * *